United States Patent [19]

Torrington

[11] 3,870,320

[45] Mar. 11, 1975

[54] PICKUP ARM CONTROL FOR VIDEO DISC PLAYER

[75] Inventor: Leslie Albert Torrington, Indianapolis, Ind.

[73] Assignee: RCA Corporation, New York, N.Y.

[22] Filed: Mar. 25, 1974

[21] Appl. No.: 454,168

[52] U.S. Cl. ................ 274/23 A, 274/9 R, 274/9 A

[51] Int. Cl. ......................... G11b 3/22, G11b 25/04

[58] Field of Search .... 274/23 R, 23 A, 13 R, 15 R, 274/9 R; 360/72, 105, 107

[56] References Cited

UNITED STATES PATENTS

| | | | |
|---|---|---|---|
| 3,272,513 | 9/1966 | Jeles | 274/23 A |
| 3,661,397 | 5/1972 | Worth et al. | 274/23 A |
| 3,767,848 | 10/1973 | Schuller et al. | 274/23 A |

*Primary Examiner*—Harry N. Haroian
*Attorney, Agent, or Firm*—Eugene M. Whitacre; Stephen Siegel; William Meagher

[57] ABSTRACT

A transducer signal pickup assembly is positioned over a desired portion of video encoded disc medium by apparatus arranged to selectively engage different portions of a first rotating belt to effect movement of the pickup assembly toward or away from the center of the disc. Further positioning of the transducer assembly in a tracking mode for facilitating playback of the signal encoded disc is provided by engaging a second rotating belt.

13 Claims, 3 Drawing Figures

PICKUP ARM CONTROL FOR VIDEO DISC PLAYER

Figure 1:
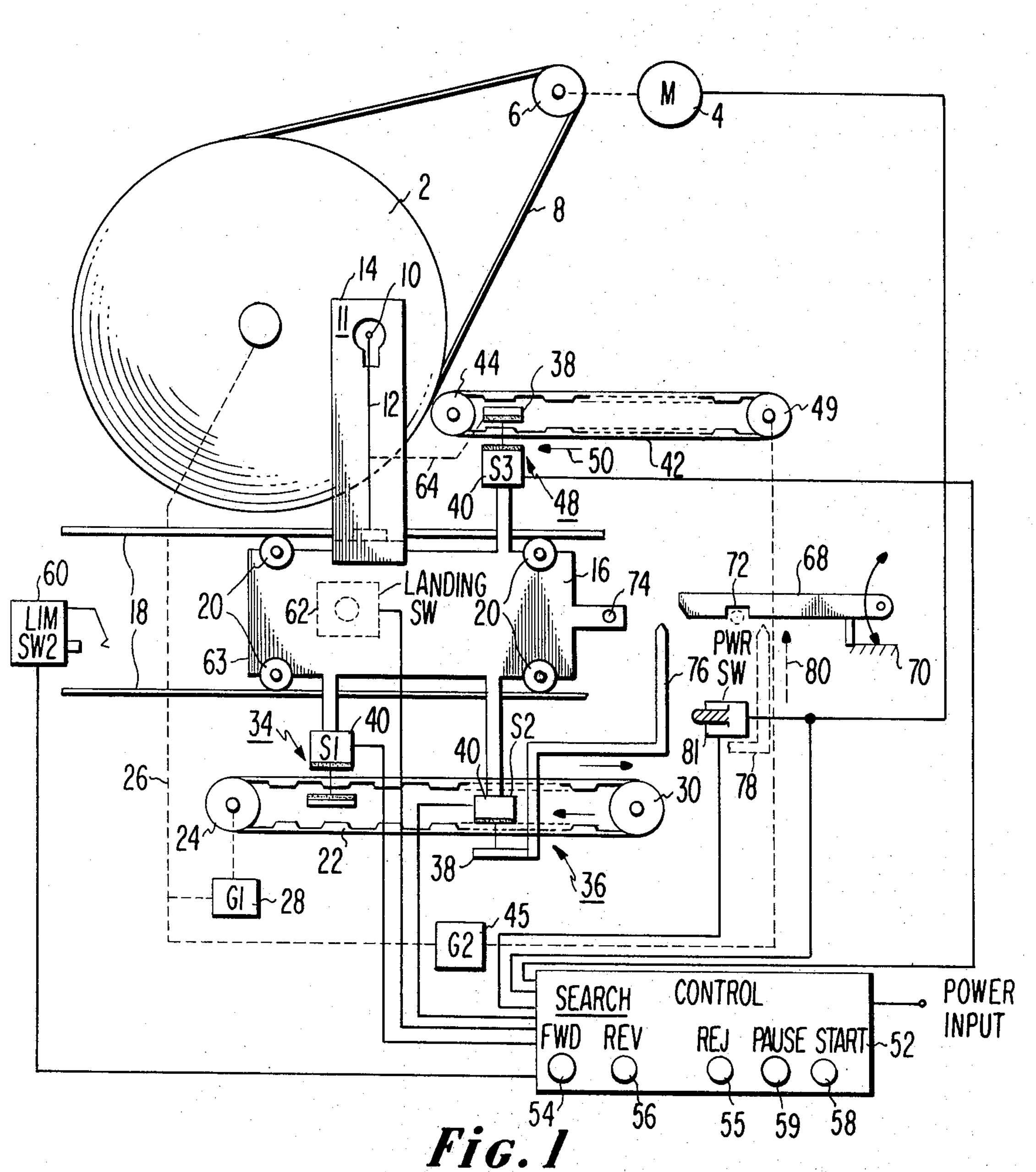

This invention relates to an arrangement for playing back disc type records on which is recorded video type information, and more particularly mechanism for providing desired positioning and controlled movement of a playback transducer device for recovering such video information.

One type of video disc reproducing system senses the capacitance between a stylus playback device and a disc record to reconstruct the video information embossed within a spiral groove on the disc record. The stylus may include a thin conductive element or electrode which is arranged to ride in the spiral groove of the record which is rotated at high speeds. In such systems, the video information is recorded in the form of geometric variations in the spiral groove on the surface of the disc record. The disc surface may include a conductive material covered with a thin coating of dielectric material. The stylus electrode cooperates with the conductive material and dielectric coating to form a capacitor. As the disc record is rotated, an edge of the conductive electrode, while riding in the disc groove, cooperates with the disc record to establish capacitive variations due to the geometrical variations in the spiral groove. The capacitor formed by the record and stylus may be coupled to a tuned circuit. Consequently, as the record is rotated, the resultant capacitive variations vary the resonant frequency of the tuned circuit. The tuned circuit may be excited by a fixed frequency oscillator, and thus, as the resonant frequency of the tuned circuit varies (due to geometrical variations in the spiral groove), the response of the tuned circuit to the excitation signal voltage changes as a function of the recorded information. This varying excitation signal voltage may be utilized to provide output signals which vary as a function of the recorded information.

In such systems, it is desirable to insure proper initiation and termination of information playback and provide proper movement of the stylus transducer during playback of the grooved record surface. It is also desirable to provide an arrangement for movement of the playback transducer wherein the start position for playback of the video information may be selectively varied. In addition, the ability to advance the playback transducer to a point beyond a present playback position or return the transducer to a point on the record previously played back is an extremely convenient and desirable feature in such a system. This, however, is preferably to be accomplished in more rapid fashion than the normal movement of the transducer over the record for playback of information.

It is further desirable that various control functions including positioning and controlling the movement of the playback transducer device be provided in automatic manner. The automation of such player features eliminates the need for operator handling of the playback mechanism, thereby minimizing the chance of damage to the system. It also provides for reasonably precise and repeatable operation of the various playback mechanisms. Such automation of the playback apparatus further permits the possibility of remote controlled operation, as well as, allowing the mechanism to be enclosed during operation to prevent inadvertent operator injury from contact with the rapidly rotating record disc or undesirable effects due to stray signal radiations. It will be appreciated that these and other desirable features must be accomplished in a simple and economic manner, which does not unduly add to the complexity or interfere with the desired normal operation of the playback system.

Thus, in accordance with the invention, there is provided an advantageous arrangement for controlling a movable transducer assembly with respect to a disc type record medium. The arrangement includes a first drive belt and means for driving this first belt at a first given velocity, and a second drive belt and means for driving this second belt at a velocity different from the velocity of the first belt. A first means is arranged for selectively coupling the transducer assembly to different portions of the first drive belt for providing motion to the transducer assembly toward and away from the center of the disc. And a second means is arranged to selectively couple the transducer assembly to portions of the second drive belt for providing motion to the transducer assembly toward the center of the disc.

In accordance with a further feature of the invention, a controllable latching means is provided to cooperate with the movable transducer assembly when it is in a given position. The latching means is operative in a first condition to inhibit movement of the transducer assembly. Means are provided to control the operation of the latching means.

Figure 2A:
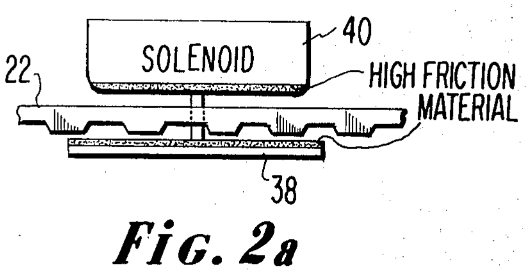
Figure 2B:
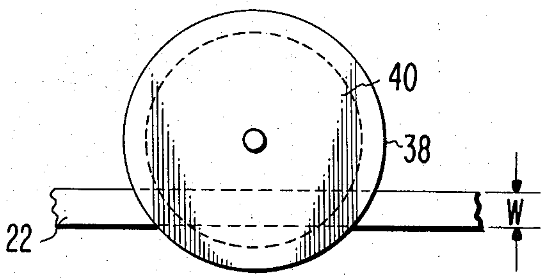

A complete understanding of the invention can be obtained from the following description thereof taken in conjunction with the accompanying drawing in which:

FIG. 1 is a plan view of a diagrammatic representation in simplified form of a disc playback system embodying the invention; and FIGS. 2*a* and 2*b* illustrate further details of a portion of the arrangement shown in FIG. 1.

As shown in the figures of the drawing, the playback system includes a turntable 2 which supports and rotates a video disc record. The turntable 2, for example, may be driven by a motor 4 coupled to a pulley 6 which drives a belt 8 disposed about the turntable. A playback transducer assembly 11 includes a stylus 10, which cooperates with a record on the turntable 2 and is disposed at the end of an arm 12. The transducer assembly 11 is disposed within a housing 14. The housing 14 is mounted on a carriage 16 which is movable along a set of rails 18 by a set of rollers 20 secured to the carriage 16. The movable mounting for transducer assembly 11 is arranged to provide movement of the stylus portion of transducer assembly 11 along a radial path with respect to the record, and in a plane substantially parallel to the major surface of the turntable 2. It will be appreciated that the apparatus illustrated in the figures is not drawn to scale.

To provide controlled positioning and movement of transducer assembly 11, first and second drive arrangements are provided for moving the carriage 16 to which the playback transducer assembly is fixedly secured. The first drive arrangement is utilized for movement of transducer assembly 11 onto and away from a record disposed on the turntable. In addition, the first drive arrangement is operative in a manner to allow selective movement of the transducer assembly in rapid fashion over the record either toward or away from the center of the turntable 2. The second drive arrangement, which is operated at a rate slower than that of the first drive arrangement, is operative to provide movement of the transducer assembly during actual playback from a record on the turntable 2.

The first drive arrangement includes an endless belt 22 disposed about a pair of spaced pulleys 24 and 30. One of the pulleys 24 is rotatably driven from the turntable 2 by mechanical means 26 including a first gear assembly 28. The first gear assembly 28 is responsive to the rotation of turntable 2 to provide continuous rotation of pulley 24 and therefore belt 22. Belt 22 is arranged to provide longitudinal motion along a path perpendicular to a line disposed radially with respect to the turntable 2.

Secured to the carriage 16 for movement therewith are a pair of belt engaging or grasping members 34 and 36. The members 34 and 36 are arranged to engage portions of the belt member 22. The belt grasping members 34 and 36, for example, may comprise an electrically operated solenoid. For such an arrangement each of the solenoids includes a movable member 38 whose position is controlled by an energizing winding in the housing 40 of the solenoid. For one condition of the solenoid, the housing 40 and movable member 38 are spaced from the belt 22, thereby decoupling the belt 22 from the carriage 16. When it is desired to couple movement of the belt 22 to carriage 16, the solenoid winding is energizing causing the belt 22 to be grasped between the members 38 and 40.

As shown in FIG. 2*a*, a high friction coating such as a rubber material, is provided on the belt engaging surfaces of members 38 and 40 to enhance gripping engagement of belt 22.

As shown in FIG. 2*b*, the surface area of the gripping surfaces of members 38 and 40 are made to have a dimension which exceeds the width W of the drive belt 22, as well as extending for a significant distance along the belt 22.

The second drive arrangement includes a further separate endless belt 42. The belt 42 is disposed about a further pair of pulleys 49 and 44. Pulley 49 is arranged to be driven from the turntable 2 by mechanical means 26 and a further gearing assembly 45. Since the second drive arrangement is for moving the transducer assembly during record playback, the gearing assembly 45 is arranged to provide movement of the belt 42 at a velocity less than the rate of movement of the belt 22 of the first drive arrangement. It is also to be noted that since movement of belts 22 and 42 is in response to rotation of the turntable 2, movement of the transducer assembly 11 is accomplished in a manner synchronized with respect to the rotation of the turntable 2.

The belt 42 is arranged to provide movement of the stylus portion of assembly 11 in a direction radially toward the center of a record disposed on the turntable 2. This facilitates tracking of the stylus 10 with the spiral groove of the record during playback. Belt 42 is arranged to have a portion thereof grasped by a belt engaging means 48, which may also comprise a solenoid type device such as discussed herein with respect to the first drive arrangement. The member 48 is fixedly mounted to the carriage 16 for motion therewith. Upon the member 48 being actuated, the motion of belt 42 is coupled by means of the member 48 to the carriage 16, which results in movement of transducer assembly 11 in the direction of arrow 50.

It will be understood that while the second drive arrangement is arranged to provide movement of transducer assembly 11 toward the center of a record for playback, it is also possible to provide playback in the opposite direction by utilizing for the second drive means the two-solenoid arrangement discussed with respect to the first drive means.

In operation of the disclosed arrangement, the belt members 22 and 42 are continuously driven from the turntable 2 at different velocities by the respective gearing assemblies 28 and 45. The belt engaging or motion coupling members 34, 36 and 48, which are normally in non-engaging relation with the belts, are actuated by control means which may be located within the control unit 52. More particularly, the control means is arranged such that only one of the motion coupling means 34, 36 or 48 is enabled at a given time for coupling motion of the movable belt means to the transducer assembly. Thus, when it is desired to move the pickup stylus of transducer assembly 11 from a rest position laterally spaced from the turntable toward the center of a record or to move stylus 10 further toward the center of the record, the search/forward control button 54 is utilized to energize the belt coupling member 36. Correspondingly, when it is desired to move stylus 10 away from the record center or to its rest position, the search/reverse control button 56 may be utilized to actuate the motion coupling member 34. The start control button 58 may be utilized to energize the motion coupling means 48 when it is desired to move stylus 10 over the record for playback at the reduced velocity of the belt member 42.

Where desired, the playback system may also include a limit switch 60 and a landing switch 62 which are operated in response to engagement by the movable carriage 16. The limit switch means 60 may be arranged to be engaged by the carriage 16 at the point where the stylus 10 reaches a portion of the record near its center. To inhibit further advancement of the transducer in the forward direction, the limit switch means 60 may be intercoupled with the control means to provide disabling of either motion coupling means 36 or coupling means 48. In addition, the limit switch means 60 can be arranged when actuated to energize the member 34, thereby causing a reversal of motion of the transducer assembly outward toward the edge of the record.

The landing switch 62 may be arranged to engage the leading edge 63 of the carriage 16 at a point where the stylus 10 is positioned at the beginning of the information portion of the record. In response to actuation by the carriage 16, the landing switch 62 may be arranged to disable the motion coupling means 36 and energize the motion coupling means 48, thereby automatically discontinuing a searching operation of the transducer assembly and instituting playback at a predetermined point at the beginning of the record. Hence, an arrangement may be effected wherein depression of start switch 58 causes engagement of motion coupling means 36 until carriage 16 toggles landing switch 62. Thereafter, coupling means 36 is disengaged and coupling means 48 engaged. Such a sequence of events provides rapid movement of stylus 10 from a rest position away from the recorded record to a position over the record's edge and subsequent slow stylus movement for record play.

It may also be noted that there is provided a mechanical linkage shown diagrammatically by the dashed line 64. The linkage member 64 has one end coupled to the movable member of the belt coupling means 48 and a further portion coupled to the arm 12 of the transducer assembly. For the condition where the motion coupling member 48 is disabled, the member 64 is effective in maintaining the stylus 10 in spaced relation to the record. The member 64 is movable in response to actuation of the coupling member 48 to allow the transducer arm 12 and therefore stylus 10 to come into contact with a record on turntable 2. Linkage 64 has been advantageously arranged to remove stylus 10 from a record when coupling means 48 is de-energized. Stylus 10 has a relatively small cross-sectional area at the point of contact with a record and applies a pressure to the record that is in the order of 28,000 pounds per square inch. If stylus 10 is allowed to rest on a record while such record is not in motion, irreversible damage may be caused to the record's surface. In the event of a power failure or removal of electrical power while a record is being played, coupling means 48 becomes de-energized and lifts stylus 10 from the record preventing damage to the record's surface.

A pause switch 59 may be incorporated with the player mechanism for providing a means to inhibit further play of the record. Pause switch 59 is arranged to decouple energy to motion coupling means 38 thereby decoupling carriage 16 from drive belt 42 and lifting stylus 10 off from the record. Friction between rollers 20 and rails 18 inhibit movement of carriage 16 when motion coupling means 34, 36 and 48 are de-energized thereby preventing inadvertent motion of carriage 16 during depression of pause switch 59.

In one desirable arrangement of the apparatus in FIG. 1, a reject button 55 may be incorporated to stop record play and return transducer 11 to a rest position. Reject button 55 is coupled to motion coupling means 48 and 34 for providing de-energization and energization of the respective coupling means. Upon depression of button 55, motion coupling means 48 is de-energized lifting stylus 10 from the record and decoupling carriage 16 from belt 42. Concurrently, motion coupling means 34 is energized coupling carriage 16 to belt 22 for moving transducer assembly 11 to a rest position away from turntable 2. The rest position of transducer assembly 11 may correspond to the fixed position described below with respect to the carriage latching arrangement.

It will be understood that there are certain conditions to which the playback system arrangement may be subjected, such as transit of the system, which make it desirable to maintain the movable carriage 16 and therefore transducer assembly 11 in a given fixed position. Further, it may be desirable to maintain transducer assembly 11 in a fixed position away from the record surface of the turntable, when the system is not being operated and a record is not disposed on the turntable. In this way, damage to parts of the system such as the transducer assembly may be avoided. Thus, there may be provided in the system a controllable latching means for rendering the carriage assembly immovable with the transducer assembly disposed, for example, beyond the outer edge of the turntable. For accomplishing this, a pivotal latching arm 68 is secured to a fixed frame portion 70 of the playback system. The member 68 includes a notch 72 which is arranged to captively engage a pin member 74 secured to the movable carriage 16. Thus, when the carriage 16 is positioned such that the transducer assembly is disposed adjacent the periphery of the turntable 2, the pin 74 is engaged by the slot 72 to maintain the carriage in that fixed position. Release of the controllable latching arrangement is accomplished by an arm member 76 which is secured to the movable portion 38 of the motion coupling member 36. Since the arm 76 is movable with the member 36, the arm 76 assumes the position shown by dashed lines 78 when the carriage is in the immobilized position. In response to energizing of the motion coupling means 36, the arm 76 is movable in an upward direction as indicated by the dashed arrow 80. This motion of the arm 76 causes the notch 72 to be retracted from engagement with the pin member 74 on carriage 16. Thus, the carriage 16 is free for movement in response to the motion of belt 22 through the engaging means 36.

A further arrangement of the above-described latching system incorporates a power swtich 81 for removing electrical power to motor 4 when carriage 16 is in the latched position. Switch 81 is positioned such that the alignment of pin 74 with notch 72 coincides with the toggling of switch 81 by member 76 to a power off position. The off position of switch 81 removes electrical power to motor 4 allowing turntable 2 to come to rest in preparation for removal of the record thereon. Start switch 58 in control box 52 may then be arranged to electrically bypass switch 81 and provide power to motor 4 until member 76 passes over switch 81 toggling it to an "on" position. Electrical power for motor 4 may thereafter be provided through switch 81.

What is claimed is:

1. Apparatus for controlling a movable transducer assembly with respect to a disc type record medium, comprising:

a first drive belt;

means for driving said first belt at a first given velocity;

a second drive belt;

means for driving said second belt at a velocity different from said first given velocity;

a first means arranged to selectively couple said transducer assembly to different portions of said first drive belt for providing motion to said assembly toward and away from the center of said disc; and a second means arranged to selectively couple said transducer assembly to portions of said second drive belt for providing motion to said transducer assembly toward the center of said disc.

2. The invention according to claim 1 wherein said second belt is arranged for moving said transducer assembly toward said record center at a velocity substantially less than the given velocity of said first belt.

3. The invention according to claim 1 wherein said first and second belts are continuously driven.

4. A system for playing back a disc type record in which a transducer assembly is secured to a movable support for traversing said record, comprising:

a pair of separate endless drive belts;

means for continuously moving said pair of drive belts at different given velocities;

first normally disabled motion coupling means for coupling movement of a given one of said drive belts to said movable support to advance said transducer assembly selectably toward or away from the center of said record;

second normally disabled motion coupling means for advancing said transducer assembly in response to movement of the other of said drive belts; and means for enabling a selected one of said first and second coupling means.

5. The invention according to claim 4 wherein said playback system also includes a rotatably driven turntable for supporting a disc record, and wherein said belt moving means comprises first means responsive to rotation of said turntable for continuously moving said given one of said drive belts at a first velocity, and further means responsive to rotation of said turntable for continuously moving the other of said belts at a velocity less than said first velocity.

6. The invention according to claim 4 wherein each of said first and second motion coupling means includes means for grasping a drive belt portion when the respective motion coupling means is enabled, and means for coupling said belt grasping means to said movable support.

7. The invention according to claim 6 wherein said first motion coupling means includes first means for grasping said given drive belt, disposed in a first region of the path of travel of said given drive belt, and serving, when actuated, to advance said transducer assembly toward the center of said record; and second means for grasping said given drive belt, disposed in a second region of said path of travel, and serving, when actuated, to advance said transducer assembly away from the center of the record; and wherein said means for enabling said first motion coupling means comprises means for actuating a selectable one of said first and second means for grasping said given drive belt.

8. The apparatus of claim 7 in combination with a limiting means coupled to said first motion coupling means for limiting the travel of said transducer assembly toward the center of said record.

9. The invention according to claim 7, wherein each of said drive belts has a given width dimension of the major surfaces thereof, and each of said belt grasping means includes first and second members for engaging opposite major surfaces of a respective one of said belts, each of said first and second members including a belt engaging surface having a dimension which exceeds the width dimension of said belt major surface.

10. The invention according to claim 8, including means disposed on the belt engaging surface of said first and second members for providing when engaged a frictional interface between said belt and said surfaces.

11. The invention according to claim 4 including controllable latching means cooperating with said movable transducer assembly in a given position thereof and operative in a first condition to inhibit movement of said assembly, and means responsive to the operation of said motion coupling means to control said latching means.

12. The apparatus according to claim 4 wherein said transducer assembly includes a stylus, and wherein means are coupled to said second motion coupling means for lifting said stylus away from said record in response to disabling of said second motion coupling means.

13. Apparatus according to claim 7 wherein said given one of said drive belts moves at a greater velocity than said other drive belt for providing movement of said transducer assembly toward and away from said record at a greater velocity than that provided to said transducer assembly by said other drive belt.

* * * * *